United States Patent
Ryu

(10) Patent No.: US 7,025,377 B2
(45) Date of Patent: Apr. 11, 2006

(54) CURTAIN AIR BAG DEVICE

(75) Inventor: Seung Soo Ryu, Gunpo-Shi (KR)

(73) Assignee: Kia Motors Corporation, Seoul (KR)

( * ) Notice: Subject to any disclaimer, the term of this patent is extended or adjusted under 35 U.S.C. 154(b) by 264 days.

(21) Appl. No.: 10/608,396

(22) Filed: Jun. 27, 2003

(65) Prior Publication Data

US 2004/0113401 A1    Jun. 17, 2004

(30) Foreign Application Priority Data

Dec. 16, 2002    (KR) .................... 10-2002-0080276

(51) Int. Cl.
*B60R 21/16* (2006.01)
*B60R 21/20* (2006.01)

(52) U.S. Cl. .................. 280/730.2; 280/728.2
(58) Field of Classification Search ............ 280/730.2, 280/728.2
See application file for complete search history.

(56) References Cited

U.S. PATENT DOCUMENTS 6,079,732 A * 6/2000 Nakajima et al. ........ 280/728.2
6,103,984 A * 8/2000 Bowers et al. ........... 280/730.2
6,155,594 A * 12/2000 Ibe et al. .................. 280/728.2
6,234,517 B1 * 5/2001 Miyahara et al. ........ 280/730.2
6,296,269 B1 * 10/2001 Nagai et al. ............. 280/728.2
RE38,125 E * 5/2003 Shibata et al. ........... 280/730.2

FOREIGN PATENT DOCUMENTS

| JP | 11-321531 A | * | 11/1999 |
| JP | 2000-25534 A | * | 1/2000 |
| JP | 2001-191883 A | * | 7/2001 |
| JP | 2002 211345 A | * | 7/2002 |
| JP | 2002-308034 A | * | 10/2002 |

* cited by examiner

*Primary Examiner*—Ruth Ilan
(74) *Attorney, Agent, or Firm*—Morgan Lewis & Bockius LLP

(57) ABSTRACT

A curtain air bag device protects passengers within a car by preventing a front pillar trim from being detached from a front pillar panel upon the deployment of a curtain air bag. The front pillar trim is attached to a flexible curtain air bag back plate in which a curtain air bag is embedded. A space is provided through which the curtain air bag deploys. The front pillar trim is attached to the front pillar by a simple fixing means, such as a screw.

9 Claims, 5 Drawing Sheets

CURTAIN AIR BAG DEVICE

FIELD OF THE INVENTION

Generally, the present invention relates to a curtain air bag device. More particularly, the curtain air bag device includes a front pillar trim attached to a flexible back plate of the curtain air bag such that the front pillar trim is prevented from detachment from the front pillar during deployment of the air bag.

BACKGROUND OF THE INVENTION

Typically, an air bag is a safety device used in a car. The air bag fills with nitrogen gas obtained from burning innoxious solid chemicals following the operation of an impact sensor. The gas makes the air bag swell in a range of 0.02 to 0.05 seconds. The inflated air bag then prevents a secondary impact between the body of a passenger and the car structure. Air bags have increased the safety for passengers during automobile accidents.

During a side impact, the death rate of passengers is high. U.S. car accident statistics show that the number of deaths per year for side impacts amounts to roughly 30% of the total deaths from automobile accident. Recently, there has been a trend toward positioning a curtain air bag on a side roof line of automobiles. However, the typical curtain air bag has a structural drawback in that the pillar trim prevents the curtain air bag from completely covering the windows of the driver and passenger seats, thereby failing to protect the passengers of the car. Furthermore, the front pillar trim generally becomes detached from the front pillar causing injury to the occupants of the vehicle.

U.S. Pat. No. 6,402,188 B1, European Patent Publication No. EP 0 873 916 A1, and German Patent Publication No. DE 198 38 069 A1 have addressed some of the above drawbacks. As disclosed therein, the front pillar trim is configured with a notch to ensure a space through which the curtain air bag may deploy. Additional, a hook is inserted and supported to a front pillar panel for the purpose of preventing the front pillar trim from deviating from the front pillar panel. However, when the notch is formed on the front pillar trim, an additional skin material is required because the notch portion is substantially thinner, which renders the production cost undesirably raised. Further, the addition of the hook needs a strap or a specific clip for securing the front pillar trim, which renders the configuration rather complicated and also reduces assembly efficiency.

SUMMARY OF THE INVENTION

The present invention provides a curtain air bag device for providing safety for passengers in an automobile by preventing a front pillar trim from being deviated from a front pillar panel upon the deployment of a curtain air bag.

The present invention also provides a curtain air bag device which can attach a front pillar trim to a flexible curtain air bag back plate, in which a curtain air bag is embedded, using a simple fixing means such as a screw, while providing space enough to deploy the curtain air bag.

According to an embodiment of the invention there is provided a curtain air bag device comprising a curtain air bag back plate that includes a first body into which a curtain air bag is provided. The first body is adapted to be cut at one end in a direction in accordance with the deployment of the curtain air bag. Also included is one or more flexible first coupling end portions each extending from the edge of the one side of the first body and having a first through hole, a cut part, and a first coupling hole. A front pillar trim has a plurality of detachable mounting support parts formed on one side. Coupling pins are secured on one end thereof and correspond to the detachable mounting support parts and are detachably coupled to a front pillar panel on the other end by passing through the cut part and the first coupling hole. Also included is a coupling support part protruded on one side adjacent to a second through hole formed on each of the both ends thereof in such a manner as to correspond to the second through hole. A plurality of mounting support members each including a hollow type of second body having a screw coupling hole formed on one surface and opened on the other surface. A coupling end portion having an end extended from the edge of one side of the second body having a coupling hole formed thereon. A plurality of fixing parts each including a first coupling bolt passed through the coupling hole corresponding thereto for coupling to the coupling support part, and a second coupling bolt passed sequentially through the second through hole, the screw coupling hole, and the first through hole corresponding thereto in such a manner as to be inserted into the corresponding portion of the front pillar panel.

It is preferable that the first body of the curtain air bag back plate has a section in the shape of a trapezoid such that the length of one surface on which the cut part is formed is substantially shorter than that of the opposite surface.

It is preferable that the first through hole is provided with a metal reinforcing member for enhancing the rigidity of the first through hole. The reinforcing member includes a hollow type of body inserted into the inside of the first through hole and a locking end portion that is placed on the surface of the first coupling end portion. The outer peripheral surface of one end of the hollow type of body has an outer diameter larger than the inner diameter of the first through hole.

It is preferable that the coupling end portion of each of the mounting support members is coupled to each of the coupling support parts by means of each of the first coupling bolts. The second body of each of the mounting support members is disposed in such a manner that the center thereof is on the same line as the center of each of the second through holes.

It is also preferable that the curtain air bag device further comprises a stopper adapted to be inserted from the opposite direction of the front pillar trim on which the mounting supporting members are placed, such that, the second through hole is opened and closed. The stopper having a plurality of locking ends formed on one side thereof in such a manner as to be passed through the second through hole and locked to the one side of the front pillar trim.

Alternatively, a curtain air bag device of the present invention comprises a front pillar trim defining at least one hole therethrough and including at least one detachable mounting support member. Also included are coupling pins coupled on a first end with the detachable mounting support member and coupling on a second end with a front pillar of a vehicle with at least one mounting support member coupling the front pillar trim with the front pillar. A flexible curtain air bag back plate configured to couple between the front pillar trim and the front pillar by the coupling pins and the mounting support member. Also included is an air bag chamber comprising a flexible substantially box shaped chamber open along one side wherein the air bag chamber is coupled with the flexible air bag back plate.

In an alternative embodiment the air bag chamber is substantially trapezoidal in cross section.

In yet another embodiment the flexible curtain air bag back plate further comprises reinforcing members reinforcing the coupling between the mounting support member and the flexible curtain air bag back plate. The reinforcing member can be substantially a metal washer shaped device.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
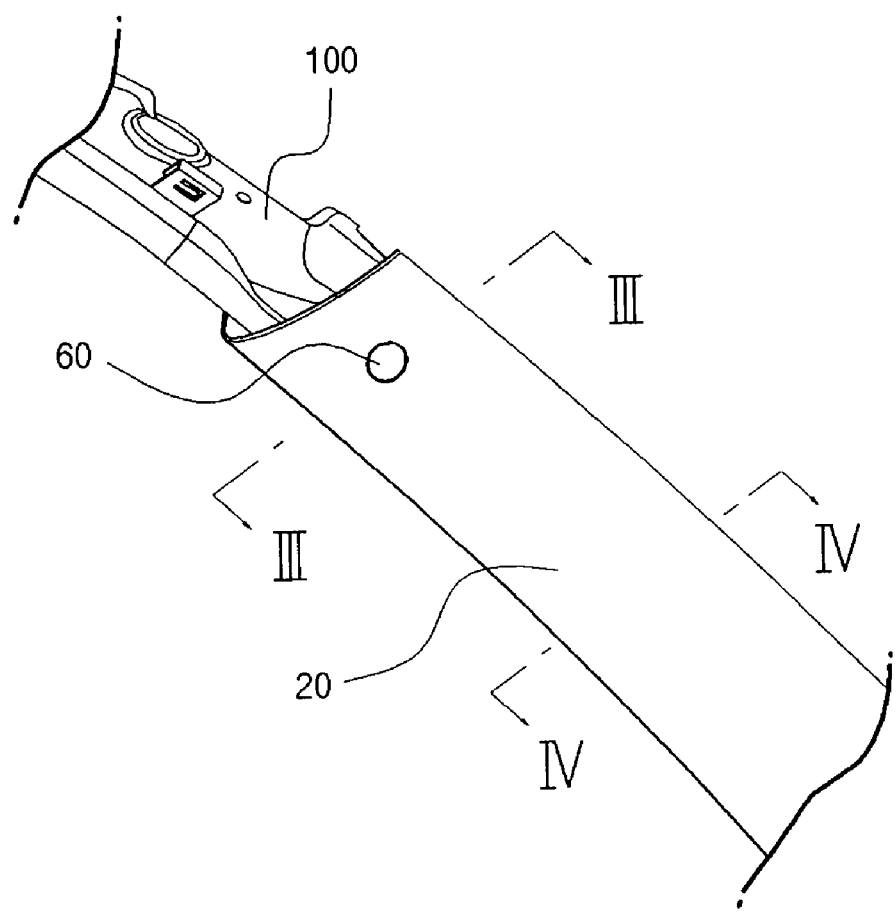
FIG. 1 is a perspective view showing a curtain air bag device assembled within a front pillar panel according to an embodiment of the present invention.
Figure 2:
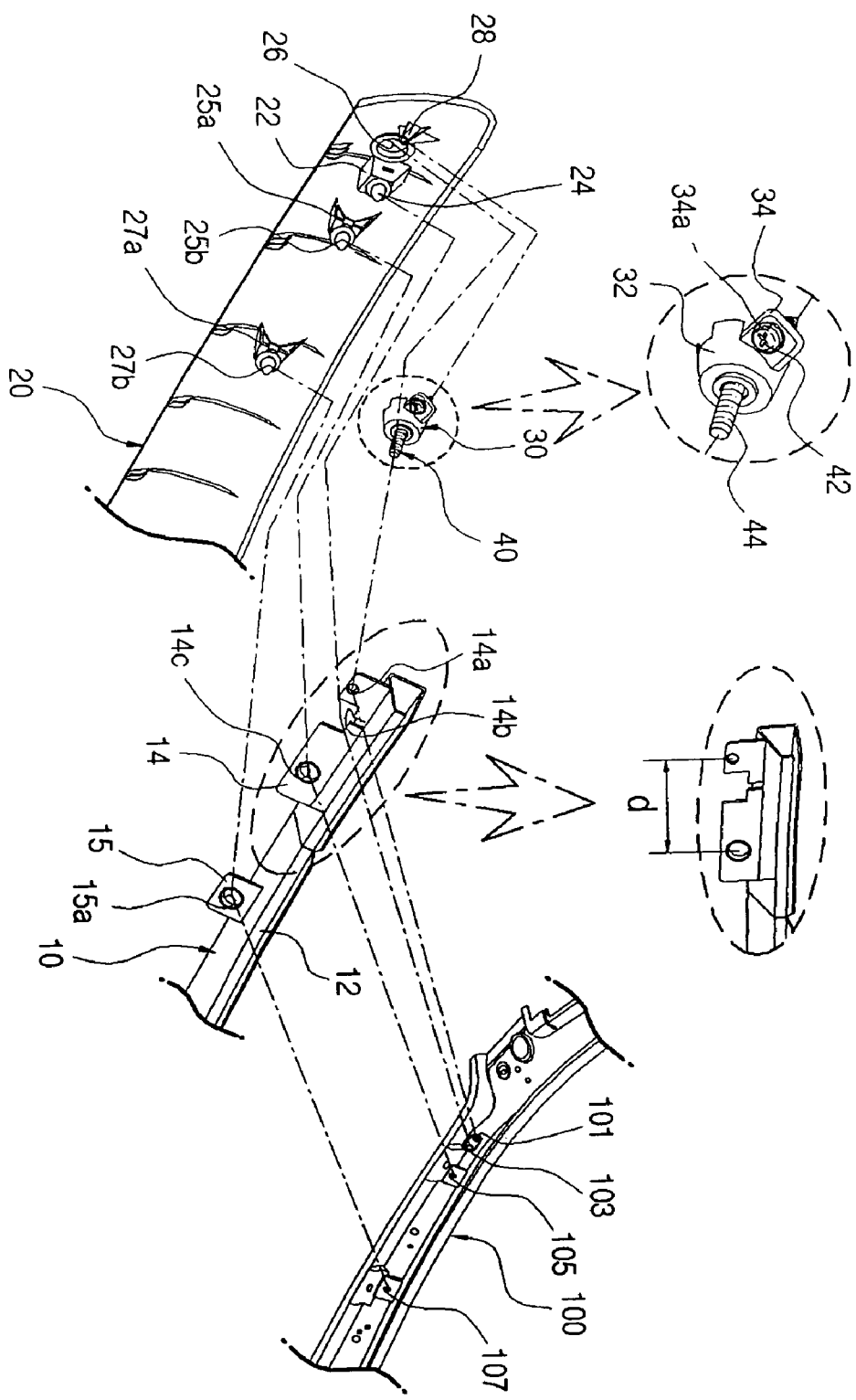
FIG. 2 is an exploded perspective view of the curtain air bag device of FIG. 1.
Figure 3:
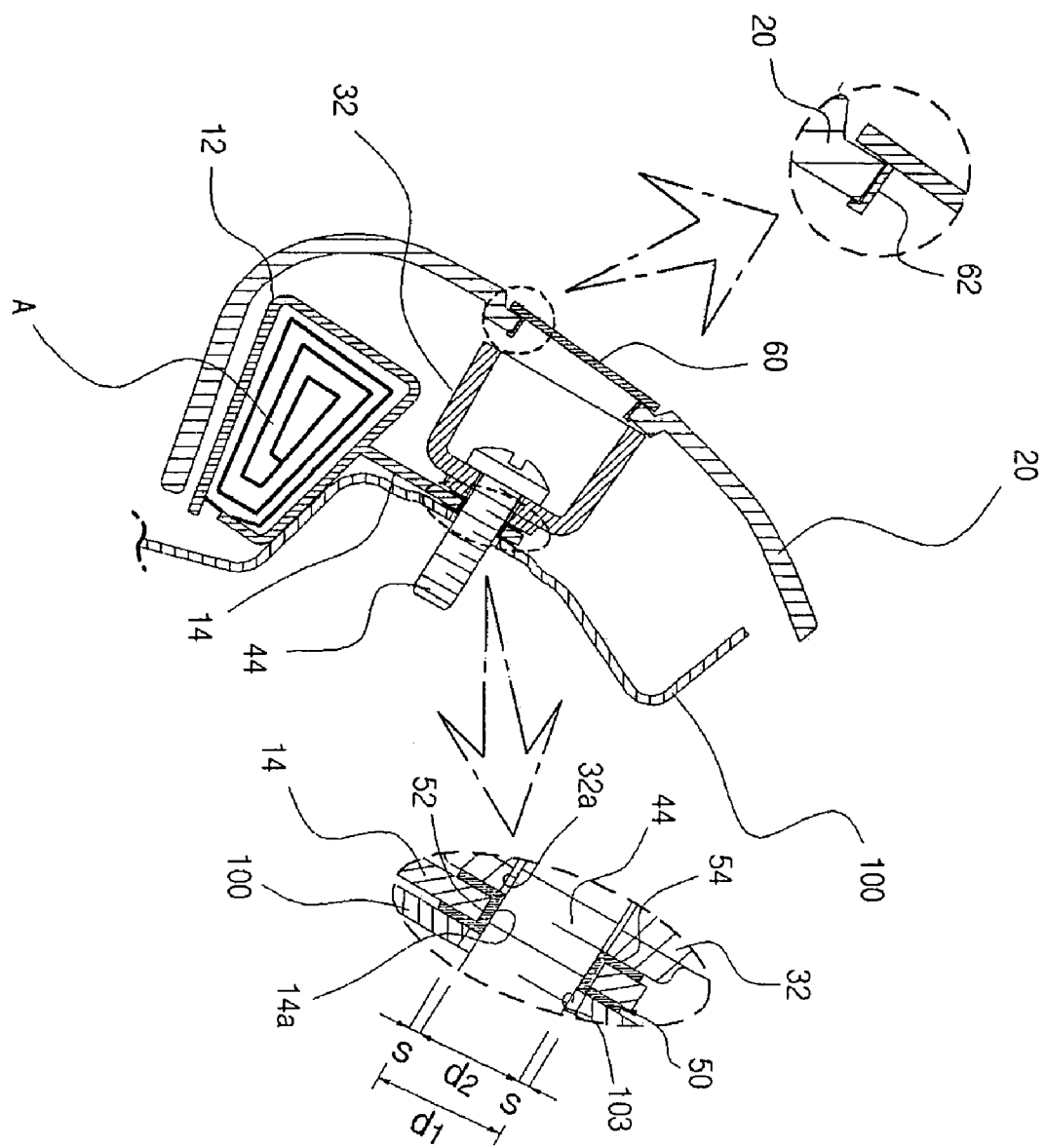
FIG. 3 is a cross-sectional view taken along the line III—III in FIG. 1.
Figure 4:
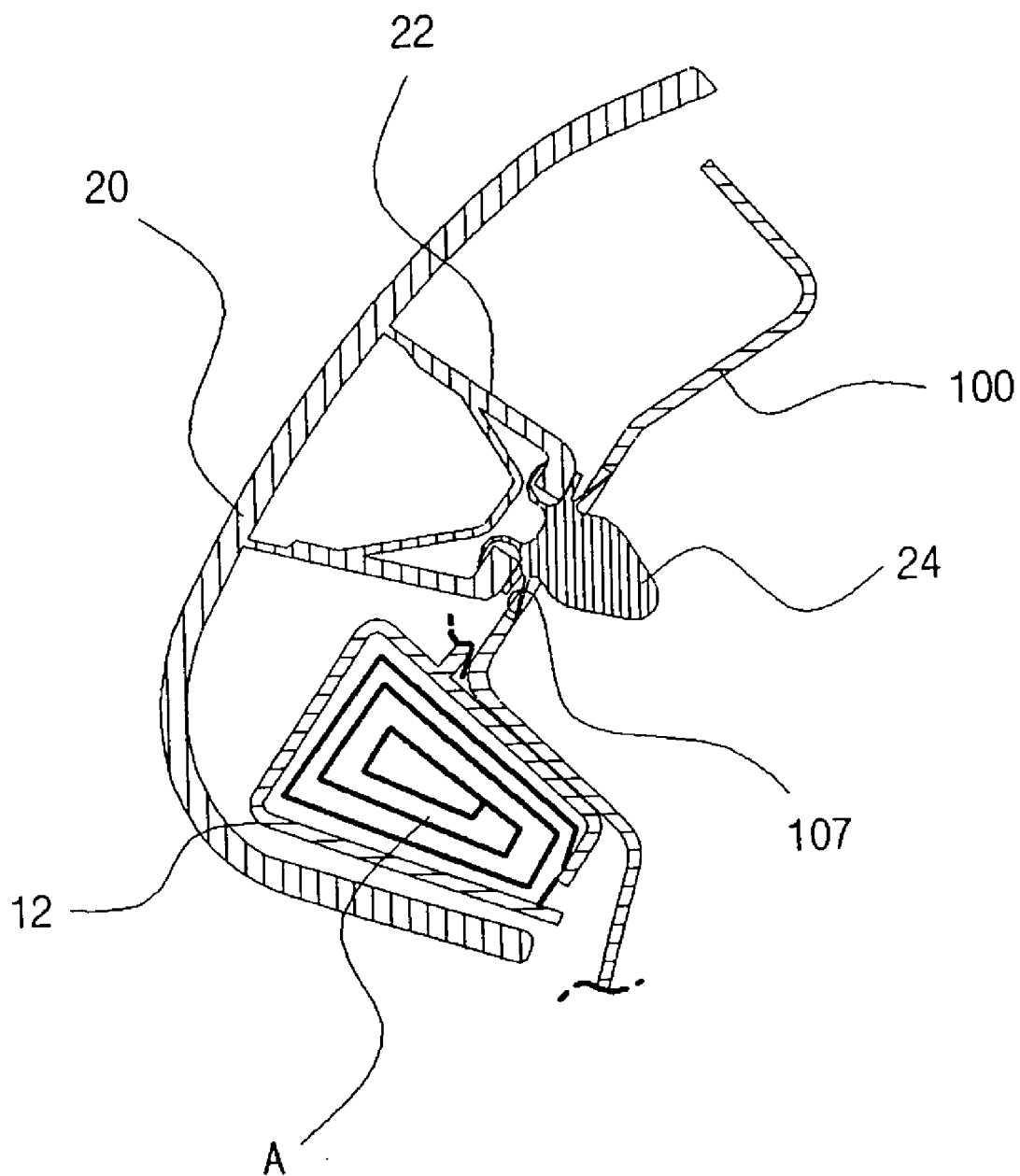
FIG. 4 is a cross-sectional view taken along the line IV—IV of FIG. 1.

According to FIGS. 1–4, the curtain air bag device according to the present invention is constructed such that a curtain air bag back plate 10 (FIG. 2) into which a curtain air bag A (FIG. 3) is received, is assembled with a front pillar trim 20 and then mounted on a front pillar panel 100 of a side chassis of a car. The curtain air bag back plate 10 includes a hollow type of body 12 (FIG. 3) in which the curtain air bag A is received. The body 12 is cut along the end of one side in a lengthwise direction corresponding to a direction in which the curtain air bag A deploys. The body 12 has a section in the shape of a trapezoid such that the length of one surface on which the cut part is formed is substantially shorter than that of the opposite surface, which enables the curtain air bag A to be easily deployed. The body 12 is integrally formed with one or more first coupling end portions 14 (FIGS. 2 and 4). Each of the first coupling end portions 14 includes a through hole 14a through which a second screw 44 of a fixing part 40 and a mounting support member 30 are coupled. The first coupling end portions 14 also include a cut part 14b, formed on one end of the first coupling end portion 14 and a first coupling hole 14c that corresponds to a first coupling pin 24 formed on the other end.

It is preferred that the first coupling end portion 14 be formed of a flexible, synthetic resin. Being flexible, a space can be provided through which the curtain air bag A can fully deploy (see FIG. 5).

The cut part 14b is provided for the purpose of avoiding an interference caused when the first coupling pin 24 of a first detachable mounting support part 22 is assembled with a second coupling hole 103 of the front pillar panel 100 (described below). The cut part 14b may be in the form of a hole like the first coupling hole 14c and a second coupling hole 15a in configurations where no interference occurs.

Preferably, the first coupling end portion 14 is provided on both ends of the body 12. More preferably, between the first coupling end portions 14 are provided one or more second coupling portions 15 on which the second coupling hole 15a is formed.

A distance 'd' between the through hole 14a of the first coupling end portion 14 and the first coupling hole 14c, as shown in FIGS. 2 and 3. The distance 'd' provides for the movement of the front pillar trim 20 upon the deployment of the curtain air bag A, described in detail below.

The front pillar trim 20 includes the first detachable mounting support part 22. The detachable mounting support part 22 is formed on one surface of the front pillar trim 20 such that it corresponds to the cut part 14b and a second detachable mounting support part 25a corresponding to the first coupling hole 14c. First and second coupling pins 24 and 25b are disposed on top portions of the first and second detachable mounting support parts 22 and 25a such that they can be detachably coupled to the front pillar panel 100. The front pillar trim 20 also includes a through hole 26 on both ends of the front pillar trim 20. A coupling support part 28 protrudes adjacent to the through hole 26. In one embodiment, the coupling support part 28 preferably includes a screw groove formed in the middle of the support part 28. A first coupling bolt 42 couples the fixing part 40 to the front pillar trim 20.

Each of the mounting support members 30 includes a hollow type of body 32 that has a screw coupling hole 32a on one surface and is opened on the other side. Each of the mounting support members 30 further includes a coupling end portion 34 extended from the edge of one side of the body 32. The coupling end portion 34 has a coupling hole 34a that corresponds to the first coupling bolt 42 of the fixing part 40.

Each of the fixing parts 40 include a first coupling bolt 42 passed through the coupling hole 34a of each of the mounting support members 30 corresponding thereto and then coupled to the coupling support part 28. Also included is a second coupling bolt 44 passed sequentially through the through hole 26, the screw coupling hole 32a and the through hole 14a corresponding thereto and finally coupled to the corresponding part of the front pillar panel 100. Referring to FIGS. 3 and 4, the center of the screw coupling hole 32a formed on the body 32 of each of the mounting support members 30 is desirably placed on the same line as the center of the through hole 26 of the front pillar trim 20. A stopper 60 (FIG. 1) is adapted to make the through hole 26 of the front pillar trim 20 opened and closed. The stopper 60 includes a plurality of locking end portions 62 formed on one surface to which the through hole 26 is coupled (see FIGS. 3 to 5). A symbol 'd1' represents an inner diameter of the through hole 103 of the front pillar panel 100, symbol 'd2' represents a diameter of the second coupling bolt 44, and 's' represents a distance between the inner diameter of the through hole 103 and the diameter of the second coupling bolt 44.

The rigidity of the first coupling end portion 14 is increased by providing a reinforcing member 50, preferably made of metal, on the first coupling hole 14a (FIG. 3). The reinforcing member 50 has a hollow type of body 52 provided on the inner peripheral surface of the first coupling hole 14a and locking end portions 54 extending from the opened portions of both ends of the body 52 in a normal direction, such that the body 52 is not deviated from the through hole 14a. Hence, the outer diameter of the both ends of each of the locking end portions 54 is designed to be larger than the outer diameter of the first coupling hole 14a. Preferably, the inner peripheral surface of the reinforcing member 50 is in close contact with the second coupling bolt 44. The body 52 is preferably provided with a screw thread on the inner peripheral surface thereof such that the screw thread is joined with the second coupling bolt 44. In use, the reinforcing member 50 is provided to prevent the through hole 14a from breaking while the first coupling end portion 14, assembled with the mounting support member 30, is deviated upon the deployment of the curtain air bag A.

Now, a method of assembling the curtain air bag device according to the present invention will be described.

First, the coupling hole 34a formed on the coupling end portion 14 of both the mounting support member 30 and the detachable mounting support part 22 are respectively aligned such that the mounting support member 30 and the front pillar trim 20 are coupled to each other by using the first coupling bolt 42.

Next, coupling pins 24, 25b and 27b of the front pillar trim 20 are passed through the cut part and the coupling holes 14b, 14c and 15a of the curtain air bag back plate 10. Next, the front pillar trim 20 assembled with the curtain air bag plate 10 are aligned with corresponding coupling holes 103, 105 and 107 of the front pillar panel 100. Thereafter, the front pillar trim 20 is secured to the front pillar panel 100 by using the palm of a hand or other tools. At this time, the second coupling bolt 44 is passed through the through hole 14a and inserted into the first through hole 101 of the front pillar panel 100.

Finally, the stopper 60 is assembled on the outside of the through hole 26 of the front pillar trim 20, thereby completing the assembling process of the curtain air bag device of the present invention.

Figure 5:
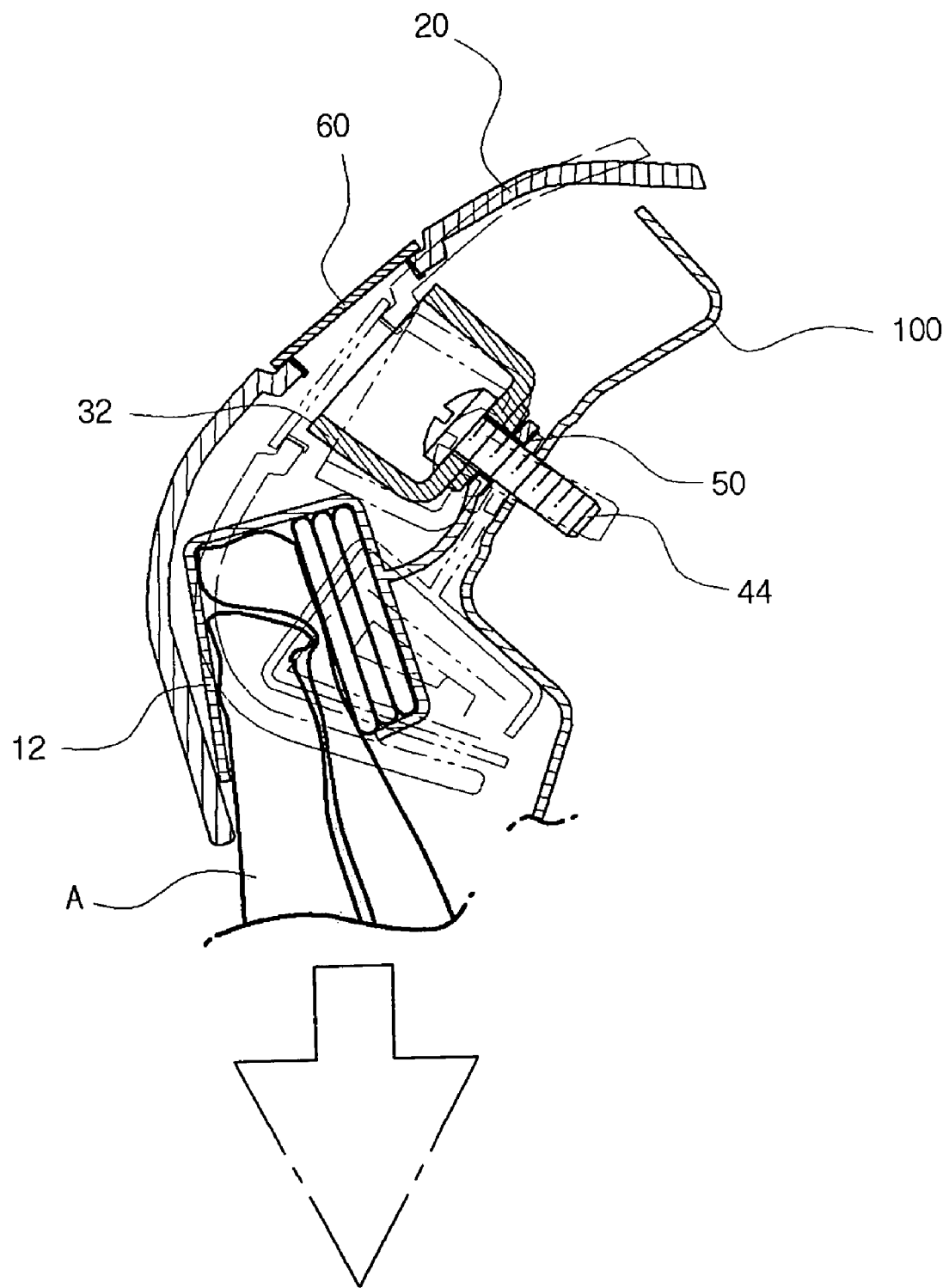
FIG. 5 is a cross-sectional view showing a state in which the curtain air bag device is deployed according to an embodiment of the present invention.

FIG. 5 shows a state in which the curtain air bag device is deployed according to the present invention. The first and second coupling end portions 14 and 15 (FIG. 2) of the curtain air bag back plate 10 elastically deform as the curtain air bag A is deployed, such that the curtain air bag A can be fully deployed.

The front pillar trim 20 of the present invention is inserted or attached to the top end of a crush pad, such as, for example, the top end of the front pillar trim 20 is slightly deviated or displaced along with the mounting support member 30, whereas the bottom end thereof is hinge-pivoted on the portion attached to the crush pad.

According to an embodiment, the front pillar trim 20 assembled with the curtain air bag back plate 10 is secured to the front pillar panel 100 by the expansion force of the curtain air bag A as the air bag is deployed, and the body 32 is movable with reference to the front pillar panel 100, such that the front pillar trim 20 moves by the distance that corresponds to the distances 'd' and 's' as shown in FIGS. 2 and 3.

Therefore, with the expansion force of the curtain air bag A as the air bag is deployed, the second coupling bolt 44 and the first coupling end portion 14 are deviated from the front pillar panel 100 by the distance 'd.' Furthermore, the front pillar trim 20 is deviated while rotating in a clockwise direction with reference to the second coupling bolt 44 that acts as a stopper during the deployment of the curtain air bag A. More particularly, if both ends of the first coupling end portion 14 are not so deviated as to fully deploy the curtain air bag A, the air bag A is not fully drawn from the lower end of the front pillar trim 20 and even destroyed by the expansion force of the curtain air bag A. Therefore, the fully deployment of the curtain air bag A and the prevention of the deviation of the front pillar trim 20 are determined based on the distances 'd' and 's'.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A curtain air bag device, comprising:
    a curtain air bag back plate including a first body into which a curtain air bag is provided, the first body having an end which is cut in a direction where the curtain air bag is deployed and one or more flexible first coupling end portions each extended from an edge of a side of the first body and having a first through hole, a cut part, and a first coupling hole;
    a front pillar trim including a plurality of detachable mounting support parts formed on one side thereof, coupling pins secured on one end thereof to correspond to the detachable mounting support parts and detachably coupled to a front pillar panel on the other end thereof by passing through the cut part and the first coupling hole corresponding thereto, and a coupling support part protruded on one side adjacent to a second through hole formed on each end of the front pillar trim;
    a plurality of mounting support members each including a hollow type of second body having a screw coupling hole formed on one surface thereof and opened on the other surface thereof and a coupling end portion having an end extended from an edge of a side of the second body, the end having a coupling hole formed thereon; and
    a plurality of fixing parts each including a first coupling bolt passed through the coupling hole corresponding thereto to be coupled to the coupling support part, and a second coupling bolt passed sequentially through the second through hole, the screw coupling hole, and the first through hole corresponding thereto in such a manner as to be inserted into a corresponding portion of the front pillar panel.

2. The curtain air bag device according to claim 1, wherein the first body of the curtain air bag back plate has a section in the shape of a trapezoid such that the length of one surface on which the cut part is formed is substantially shorter than that of the opposite surface.

3. The curtain air bag device according to claim 1, wherein the first through hole is provided with a metal reinforcing member for enhancing the rigidity of the first through hole, the reinforcing member includes a hollow type of body inserted into the inside of the first through hole and a locking end portion that is placed on the surface of the first coupling end portion in such a manner that the outer peripheral surface of one end of the hollow type of body has an outer diameter larger than the inner diameter of the first through hole.

4. The curtain air bag device according to claim 1, wherein the coupling end portion of each of the mounting support members is coupled to each of the coupling support parts by means of each of the first coupling bolts, and the second body of each of the mounting support members is disposed in such a manner that the center thereof is on the same line as the center of each of the second through holes.

5. The curtain air bag device according to claim 1, further comprising a stopper adapted to be inserted from the opposite direction of the front pillar trim on which the mounting supporting members are placed such that the second through hole is opened and closed, the stopper having a plurality of locking ends formed on one side thereof in such a manner as to be passed through the second through hole and locked to the one side of the front pillar trim.

6. A curtain air bag device, comprising:
a front pillar trim defining at least one hole therethrough and including at least one detachable mounting support member;
a coupling pin coupled on a first end with said at least one detachable mounting support member and coupling on a second end with a front pillar of a vehicle;
at least one mounting support member coupling the front pillar trim with the front pillar;
a flexible curtain air bag back plate configured to couple between said front pillar trim and the front pillar by said coupling pins and said mounting support member; and
an air bag chamber comprising a flexible substantially box shaped chamber open along one side wherein said air bag chamber is coupled with said flexible air bag back plate.

7. The device of claim 6, wherein said air bag chamber is substantially trapezoidal in cross section.

8. The device of claim 6, wherein said flexible curtain air bag back plate further comprises reinforcing members reinforcing the coupling between said mounting support member and said flexible curtain air bag back plate.

9. The device of claim 8, wherein said reinforcing member is substantially a metal washer shaped device.

* * * * *